United States Patent
Chen et al.

(10) Patent No.: US 11,196,455 B1
(45) Date of Patent: Dec. 7, 2021

(54) ISOLATION ESTIMATION SYSTEM, ISOLATION ESTIMATION METHOD, AND PROCESSOR CIRCUIT

(71) Applicant: Realtek Semiconductor Corporation, Hsinchu (TW)

(72) Inventors: Ping-Cheng Chen, Hsinchu (TW); Chih-Hung Tsai, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 0 days.

(21) Appl. No.: 17/130,231

(22) Filed: Dec. 22, 2020

(30) Foreign Application Priority Data

Jul. 21, 2020 (TW) ................................. 109124639

(51) Int. Cl.
*H04B 1/715* (2011.01)
*H04B 1/44* (2006.01)
*H04W 4/80* (2018.01)
*H04W 84/12* (2009.01)

(52) U.S. Cl.
CPC ............ *H04B 1/715* (2013.01); *H04B 1/44* (2013.01); *H04W 4/80* (2018.02); *H04W 84/12* (2013.01)

(58) Field of Classification Search
CPC .......... H04B 1/715; H04B 1/44; H04W 4/80; H04W 84/12

USPC ........................................................ 375/132
See application file for complete search history.

(56) References Cited

U.S. PATENT DOCUMENTS 9,516,698 B2* 12/2016 Schmandt et al. .... H04W 88/06
2015/0133185 A1* 5/2015 Chen et al. ....... H04W 72/1215

FOREIGN PATENT DOCUMENTS

CN 108282166 A 7/2018

* cited by examiner

*Primary Examiner* — Fitwi Y Hailegiorgis
(74) *Attorney, Agent, or Firm* — Locke Lord LLP; Tim Tingkang Xia, Esq.

(57) ABSTRACT

An isolation estimation system includes a transmitter device, a first receiver device, a second receiver device, and a processor circuit. The transmitter device adopts a first communication technology. The transmitter device is configured to transmit a transmitting signal to the first receiving device. The second receiver device is configured to acquire a leakage signal power spectral density of a leakage signal corresponding to the transmitting signal. The second receiver device adopts a second communication technology. A bandwidth of the second communication technology is narrower than a bandwidth of the first communication technology, and the second communication technology supports a frequency hopping process. The processor circuit is configured to calculate isolation according to a signal-in-air power spectral density of the transmitting signal and the leakage signal power spectral density. The isolation is for determining whether to adjust the transmitter device.

18 Claims, 4 Drawing Sheets

ISOLATION ESTIMATION SYSTEM, ISOLATION ESTIMATION METHOD, AND PROCESSOR CIRCUIT

RELATED APPLICATIONS

This application claims priority to Taiwanese Application Serial Number 109124639, filed Jul. 21, 2020, which is herein incorporated by reference.

BACKGROUND

Technical Field

The present disclosure relates to an isolation estimation technology. More particularly, the present disclosure relates to an isolation estimation system, an isolation estimation method, and a processor circuit for estimating the isolation.

Description of Related Art

With developments of technology (for example but not limited to, IoT technology), more and more electrical devices support different wireless communication technologies to transmit or receive signals, to achieve their functions.

However, when the different wireless communication technologies are used to transmit signals or receive signals at the same time, interference occurs among the signals of the different wireless communication technology. The interference causes that the error rate of receiving the signals increases, such that user experience is affected and other negative effects are generated.

SUMMARY

Some aspects of the present disclosure are to provide an isolation estimation system. The isolation estimation system includes a transmitter device, a first receiver device, a second receiver device, and a processor circuit. The transmitter device adopts a first communication technology. The transmitter device is configured to transmit a transmitting signal to the first receiving device. The second receiver device is configured to acquire a leakage signal power spectral density of a leakage signal corresponding to the transmitting signal. The second receiver device adopts a second communication technology. A bandwidth of the second communication technology is narrower than a bandwidth of the first communication technology, and the second communication technology supports a frequency hopping process. The processor circuit is configured to calculate isolation according to a signal-in-air power spectral density of the transmitting signal and the leakage signal power spectral density. The isolation is for determining whether to adjust the transmitter device.

Some aspects of the present disclosure are to provide an isolation estimation method. The isolation estimation method includes the following operations: transmitting a transmitting signal to a first receiving device by a transmitter device, in which the transmitter device adopts a first communication technology, acquiring a leakage signal power spectral density of a leakage signal corresponding to the transmitting signal by a second receiver device, in which the second receiver device adopts a second communication technology, in which a bandwidth of the second communication technology is narrower than a bandwidth of the first communication technology, and the second communication technology supports a frequency hopping process; and calculating isolation according to a signal-in-air power spectral density of the transmitting signal and the leakage signal power spectral density by a processor circuit, in which the isolation is for determining whether to adjust the transmitter device.

Some aspects of the present disclosure are to provide a processor circuit. The processor circuit is configured to calculate isolation according to a signal-in-air power spectral density of a transmitting signal and a leakage signal power spectral density, to determine whether to adjust a transmitter device. The transmitter device is configured to transmit the transmitting signal to a first receiving device. The leakage signal power spectral density corresponds to a leakage signal received by a second receiver device, and the leakage signal corresponds to the transmitting signal. The transmitter device adopts a first communication technology. The second receiver device adopts a second communication technology. A bandwidth of the second communication technology is narrower than a bandwidth of the first communication technology, and the second communication technology supports a frequency hopping process.

As described above, the isolation estimation system, the isolation estimation method, and the processor circuit of the present disclosure can estimate isolation between apparatuses with different communication technologies so as to adjust related devices or related parameters.

BRIEF DESCRIPTION OF THE DRAWINGS

The disclosure can be more fully understood by reading the following detailed description of the embodiment, with reference made to the accompanying drawings as follows.

DETAILED DESCRIPTION

The embodiments in the following descriptions are described in detail with the accompanying drawings, but the examples provided are not intended to limit the scope of the disclosure covered by the present disclosure. The structure and operation are not intended to limit the execution order. Any structure regrouped by elements, which has an equal effect, is covered by the scope of the present disclosure. In addition, the drawings are merely for illustration and are not illustrated according original sizes. For ease of understanding, the same or similar components in the following descriptions will be described with the same symbols.

In the present disclosure, "connected" or "coupled" may refer to "electrically connected" or "electrically coupled." "Connected" or "coupled" may also refer to operations or actions between two or more elements.

Figure 1:
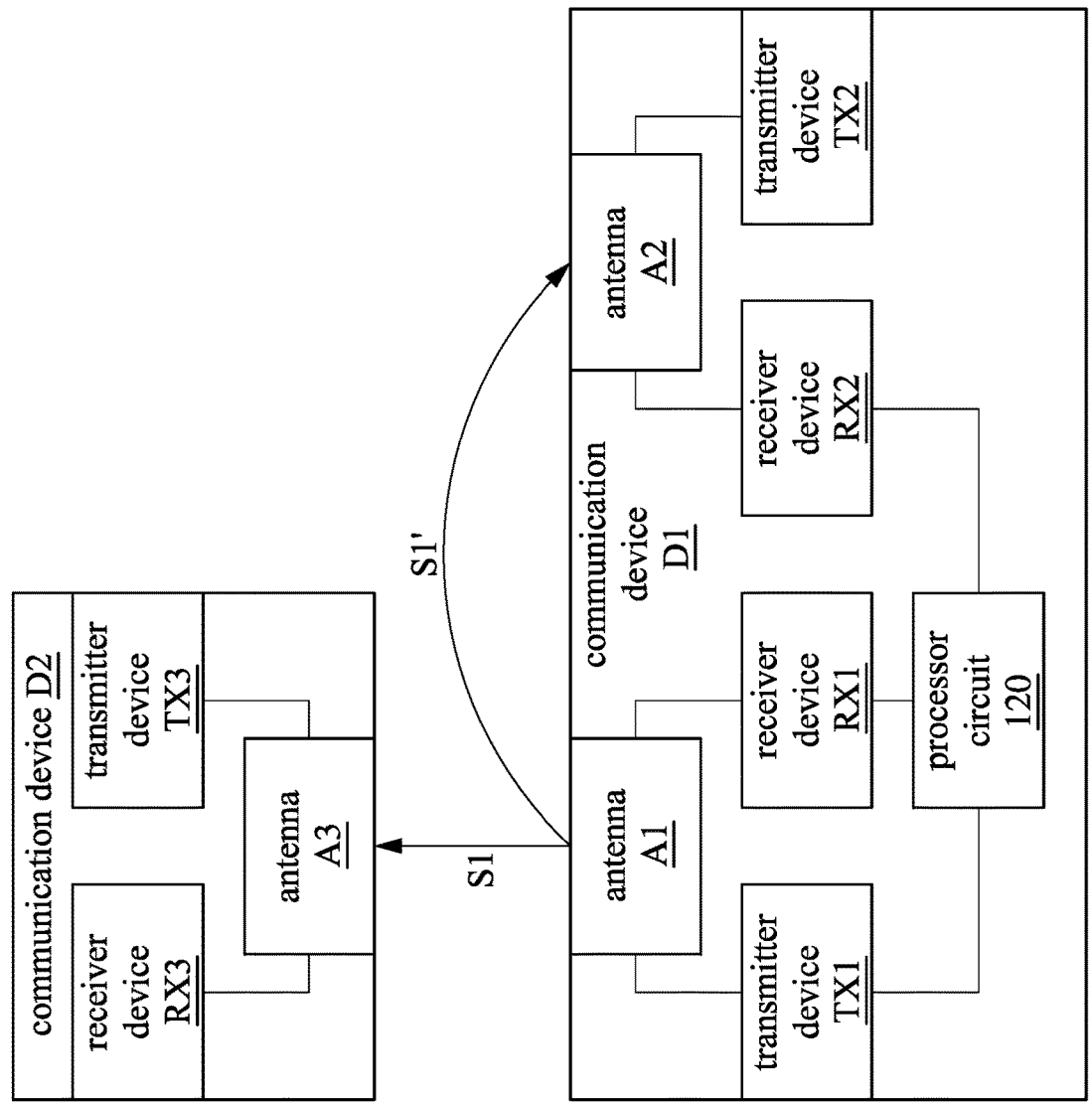
FIG. 1 is a schematic diagram of an isolation estimation system according to some embodiments of the present disclosure.

Reference is made to FIG. 1. FIG. 1 is a schematic diagram of an isolation estimation system 100 according to some embodiments of the present disclosure. The isolation estimation system 100 includes a communication device D1, and a communication device D2. The communication device D1 and the communication device D2 can transmit data or signals to each other. As illustrated in FIG. 1, the communication device D1 includes a transmitter device TX1, a transmitter device TX2, a receiver device RX1, a receiver device RX2, a processor circuit 120, an antenna A1, and an antenna A2. The communication device D2 includes a transmitter device TX3, a receiver device RX3, and an antenna A3.

The transmitter device TX1, the receiver device RX1, the transmitter device TX3, and the receiver device RX3 adopt a first communication technology. The transmitter device TX2 and the receiver device RX2 adopt a second communication technology. In some embodiments, the first communication technology is Wi-Fi technology, and the second communication technology is Bluetooth technology. For example, the transmitter device TX1 can transmit packets with Wi-Fi technology through the antenna A1, such that the receiver device RX3 receives the packets through the antenna A3. The transmitter device TX3 can transmit packets with Wi-Fi technology through the antenna A3, such that the receiver device RX1 receives the packets through the antenna A1. In addition, the transmitter device TX2 can transmit packets with Bluetooth technology through the antenna A2. The receiver device RX2 can receive packets with Bluetooth technology through the antenna A2.

In implementation, Wi-Fi technology and Bluetooth technology operate at the same frequency band, for example, Industrial Scientific Medical (ISM) 2.4G. A bandwidth of Bluetooth technology is less than a bandwidth of Wi-Fi technology. Bluetooth technology supports a frequency hopping process. The frequency hopping process is, for example, an Adaptive Frequency Hopping (AFH) process.

In some embodiments, the transmitter device TX1 transmits a transmitting signal S1 with Wi-Fi technology through the antenna A1 to the receiver device RX3. If the isolation between the antenna A1 and the antenna A2 is worse, more signal components of the transmitting signal S1 is leaked to the receiver device RX2.

When the receiver device RX2 receives a leakage signal S1' through the antenna A2, the receiver device RX2 measures a power spectral density (PSD) of the leakage signal S1' (it is called "a leakage signal power spectral density" hereafter). Then, the processor circuit 120 calculates the isolation between the antenna A1 and the antenna A2 according to a signal-in-air power spectral density of the transmitting signal S1 and the leakage signal power spectral density of the leakage signal S1'. The isolation indicates interference level between apparatuses operating at the same frequency band. The isolation can be used to determine whether to adjust the transmitter device TX1.

In some embodiments, the processor circuit 120 is implemented by a Wi-Fi driver and configured to control the transmitter device TX1, the receiver device RX1, and the receiver device RX2 at least, but the present disclosure is not limited thereto.

In some related approaches, network analyzers and a distance estimation method for estimating a distance between antennas are used to determine the isolation between the antenna A1 and the antenna A2. However, in these related approaches, a platform with external points is needed for the network analyzers, and the arrangements of the antennas during the measurement may be different from the arrangements of the antennas in practical applications. Thus, the measurement result may by wrong.

In some other related approaches, a leakage signal leaked from the transmitter device TX2 to the receiver device RX1 is used for estimating the isolation. However, in these approaches, since the receiver device RX1 does not support a frequency hopping process, it cannot sample correct signals during the measurement and it causes errors. For solving the aforementioned problems, additional circuit needs to be disposed in the receiver device RX1 which does not support the frequency hopping process. However, this method leads to higher circuit complexity and higher cost.

Compared to the related approaches above, in the present disclosure, a leakage signal (the leakage signal S1') leaked from the transmitter device TX1 to the receiver device RX2 is used for estimating the isolation. Since a bandwidth of the receiver device RX2 is narrower and the receiver device RX2 supports the frequency hopping process, the present disclosure can receive correct signals to avoid errors. In addition, the present disclosure only adds two bits in the circuit to acquire the operation states of related apparatuses and complete subsequent isolation estimation and does not need to dispose additional circuits.

Figure 2:
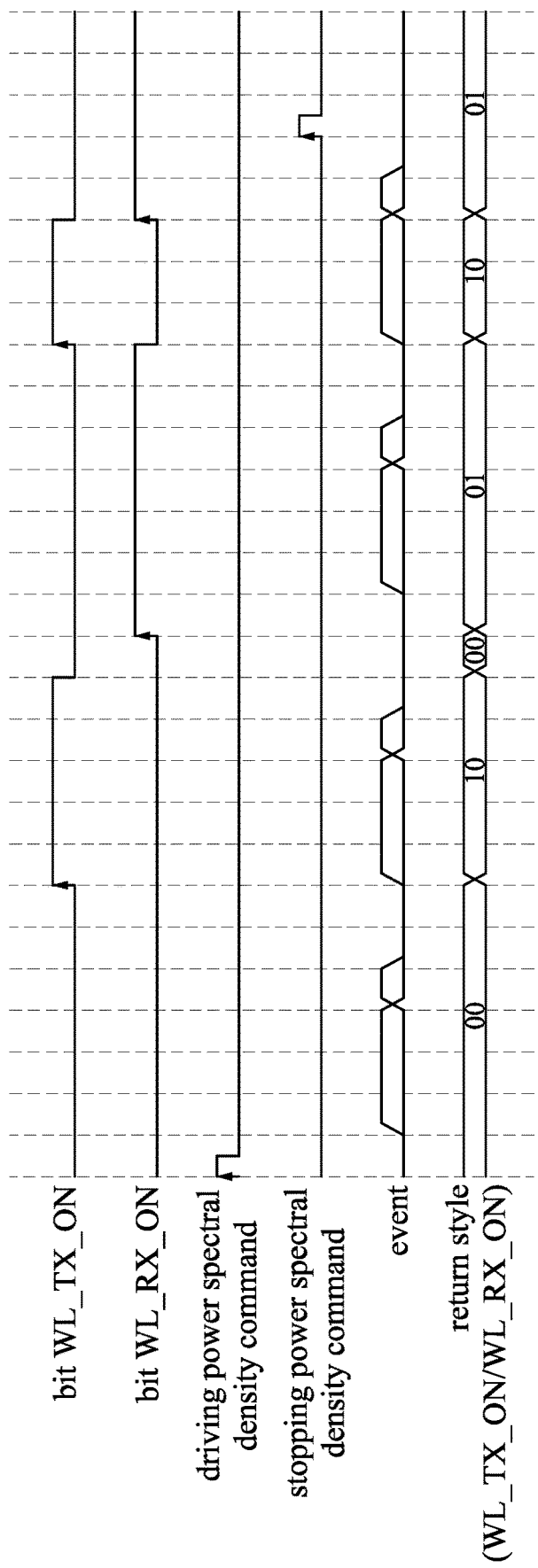
FIG. 2 is a time sequence diagram of operations of the isolation estimation system in FIG. 1 according to some embodiments of the present disclosure.

Reference is made to FIG. 2. FIG. 2 is a time sequence diagram of operations of the isolation estimation system 100 in FIG. 1 according to some embodiments of the present disclosure.

As described above, two additional bits are added in the circuit of the present disclosure to acquire the operation states of the transmitter device TX1 and the receiver device RX1. In detail, two bits WL_TX_ON and WL_RX_ON are added in the circuit. The bits constitute a return style, and the return style indicates the operation states of the transmitter device TX1 and the receiver device RX1. For example, when the bit WL_TX_ON is 1 and the bit WL_RX_ON is 0, the return style is 10. This indicates that the transmitter device TX1 is in a transmitting state. When the bit WL_TX_ON is 0 and the bit WL_RX_ON is 1, the return style is 01. This indicates that the receiver device RX1 is in a receiving state. When the bit WL_TX_ON is 0 and the bit WL_RX_ON is 0, the return style is 00. This indicates that the transmitter device TX1 and the receiver device RX1 are not in the transmitting state and not in the receiving state. In this situation, a background noise can be measured. In addition, the receiver device RX2 may be controlled to measure power spectral density periodically between a driving power spectral density command and a stopping power spectral density command.

How the processor circuit 120 calculates the isolation between the antenna A1 and the antenna A2 are described in following paragraphs.

It is assumed that the signal-in-air power spectral density of the transmitting signal S1 is X (dBm/MHz), the leakage signal power spectral density of the leakage signal S1' leaked to the receiver device RX2 is Z (dBm/MHz), and a background noise power spectral density is Y (dBm/MHz). The processor circuit 120 calculates the isolation according to the signal-in-air power spectral density X, the leakage signal power spectral density Z, and the background noise power spectral density Y.

First, for considering the effects caused by the background noise power spectral density Y, a parameter W (dBm/MHz) is defined as formula (1) below:

$$W = 10 \times \log 10(10^{Z/10} - 10^{Y/10}) \tag{1}$$

After the parameter W is calculated, the processor circuit 120 calculates an average value of the signal-in-air power spectral density X and an average value of the parameter W. Then, the processor circuit 120 utilizes formula (2) below to calculate the isolation:

$$IV = X_{AVG} - W_{AVG} \tag{2}$$

IV (dB) is isolation, $X_{AVG}$ is a Wi-Fi in-band average value of the signal-in-air power spectral density X, $W_{AVG}$ is a Wi-Fi in-band average value of the parameter W.

The isolation estimation ways in different conditions are described in following paragraphs.

If the leakage signal power spectral density Z is greater than the background noise power spectral density Y and a different between the leakage signal power spectral density Z and the background noise power spectral density Y is greater than a first value (for example, Z>Y+10), it indicates that the leakage signal power spectral density Z is much greater than the background noise power spectral density Y. In this situation, the background noise power spectral density Y can be omitted and the parameter W in formula (1) is simplified to be equal to the leakage signal power spectral density Z. Accordingly, the isolation IV in formula (2) is equal to a Wi-Fi in-band average value of the signal-in-air power spectral density X minus a Wi-Fi in-band average value of the leakage signal power spectral density Z.

If the leakage signal power spectral density Z is greater than the background noise power spectral density Y and the difference between the leakage signal power spectral density Z and the background noise power spectral density Y is less than or equal to the first value and greater than or equal to a second value (for example, Y+10≥Z≥Y+1), it indicates that the leakage signal power spectral density Z is not much greater than the background noise power spectral density Y but the leakage signal power spectral density Z is greater than the background noise power spectral density Y. In this situation, the background noise power spectral density Y cannot be omitted, and the parameter W still satisfies the formula (1) above. Accordingly, the isolation IV in formula (2) is equal to the Wi-Fi in-band average value of the signal-in-air power spectral density X minus an average value in Wi-Fi of the parameter W.

If the leakage signal power spectral density Z is equal to or less than the background noise power spectral density Y (for example, Z≅Y or Z<Y), or the difference between the leakage signal power spectral density Z and the background noise power spectral density Y is less than the second value (for example, Z<Y+1), it indicates that the leakage signal S1' leaked to the receiver device RX2 is subdued by the background noise (the background noise is louder). In this situation, the parameter W does not satisfy the aforementioned formula (1) and needs to be modified as a parameter W'. The parameter W' is equal to the background noise power spectral density Y minus an estimation value, as formula (3) below:

$$W'=Y-A \quad (3)$$

In some embodiments, the estimation value A is equal to 6. If the estimation value A is equal to 6, the parameter W' is equal to Y−6. The isolation IV in formula (2) is equal to the Wi-Fi in-band average value of the signal-in-air power spectral density X minus a Wi-Fi in-band average value of the parameter W'.

In some embodiments, if the calculated isolation is less than a threshold value, it indicates that overmuch signal components of the transmitting signal S1 is leaked to the receiver device RX2. Accordingly, the processor circuit 120 reduces transmitting power of the transmitter device TX1, to transmit the transmitting signal S1 with lower power.

Figure 3:
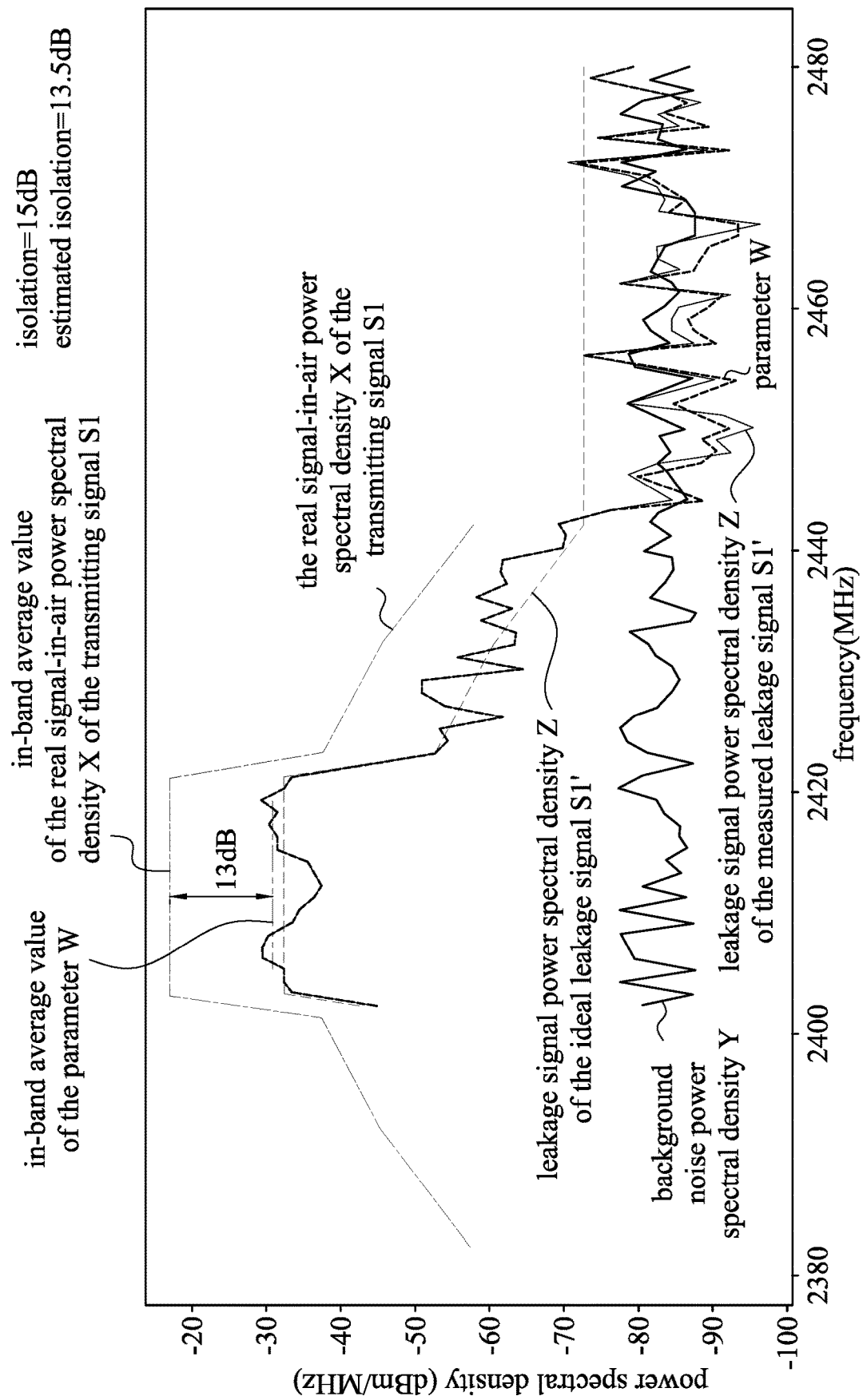
FIG. 3 is a schematic diagram of estimating isolation according to some embodiments of the present disclosure.

Reference is made to FIG. 3. FIG. 3 is a schematic diagram of estimating isolation according to some embodiments of the present disclosure. FIG. 3 illustrates the parameters used in the aforementioned calculation process, FIG. 3 is an example, and the present disclosure is not limited thereto. As illustrated in FIG. 3, the actual isolation is 15 decibel, but the estimated isolation is 13.5 decibel.

Figure 4:
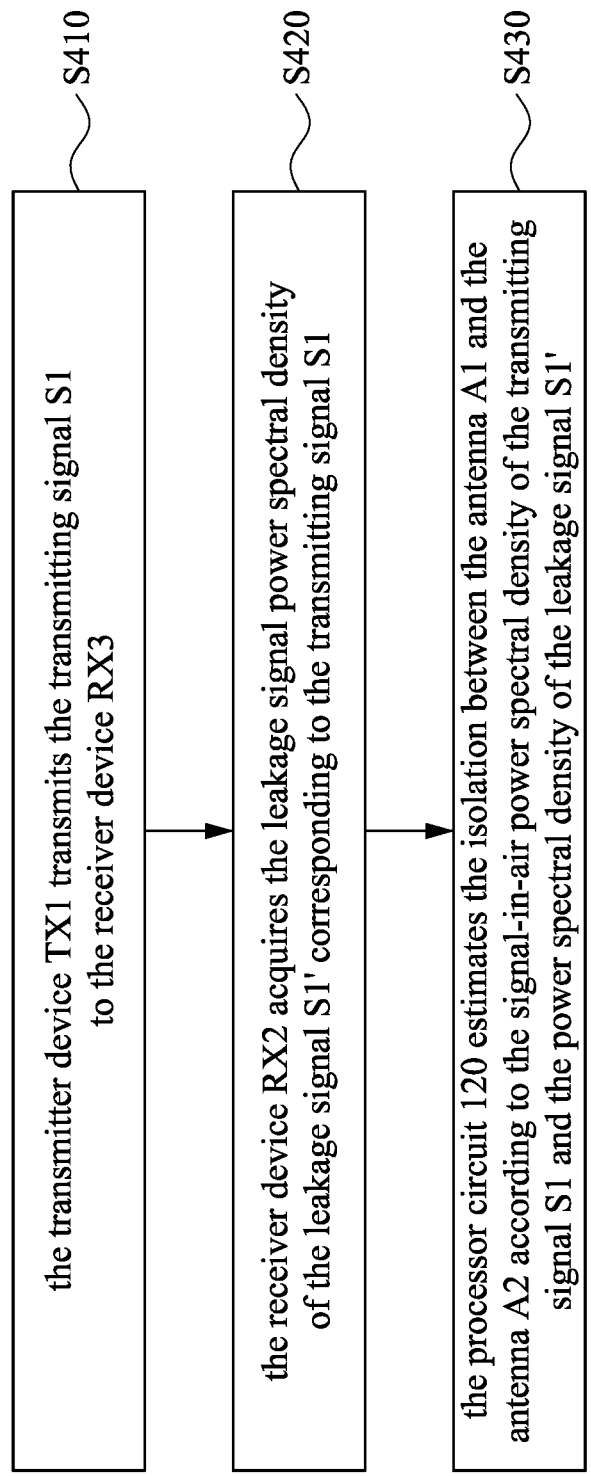
FIG. 4 is a flow diagram illustrating an isolation estimation method according to some embodiments of the present disclosure.

Reference is made to FIG. 4. FIG. 4 is a flow diagram illustrating an isolation estimation method 400 according to some embodiments of the present disclosure. The isolation estimation method 400 includes operations S410, S420, and S430. In some embodiments, the isolation estimation method 400 in FIG. 4 may be implemented to the isolation estimation system 100 in FIG. 1.

In operation S410, the transmitter device TX1 transmits the transmitting signal S1 to the receiver device RX3. In some embodiments, the transmitter device TX1 adopts Wi-Fi technology and transmits the transmitting signal S1 with Wi-Fi technology.

In operation S420, the receiver device RX2 acquires the leakage signal power spectral density of the leakage signal St corresponding to the transmitting signal S1. In some embodiments, the receiver device RX2 adopts Bluetooth technology. The bandwidth of Bluetooth technology is less than the bandwidth of Wi-Fi technology, and Bluetooth technology supports the frequency hopping process.

In operation S430, the processor circuit 120 estimates the isolation between the antenna A1 and the antenna A2 according to the signal-in-air power spectral density of the transmitting signal S1 and the power spectral density of the leakage signal S1'. The estimated isolation may be used to determine whether to adjust the transmitter device TX1. In some embodiments, the estimated isolation may be used for adjusting the transmitting power of the transmitter device TX1.

The above description of the isolation estimation method 400 includes exemplary operations, but the operations of the isolation estimation method 400 are not necessarily performed in the order described. The order of the operations of the isolation estimation method 400 disclosed in the present disclosure are able to be changed, to be added, to be replaced, to be omitted, or the operations are able to be executed simultaneously or partially simultaneously as appropriate, in accordance with the spirit and scope of various embodiments of the present disclosure.

As described above, the isolation estimation system, the isolation estimation method, and the processor circuit of the present disclosure can estimate isolation between apparatuses with different communication technologies so as to adjust related devices or related parameters.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An isolation estimation system, comprising:
   a transmitter device adopting a first communication technology;
   a first receiver device, wherein the transmitter device is configured to transmit a transmitting signal to the first receiving device;
   a second receiver device configured to acquire a leakage signal power spectral density of a leakage signal corresponding to the transmitting signal, wherein the second receiver device adopts a second communication technology, wherein a bandwidth of the second communication technology is narrower than a bandwidth of the first communication technology, and the second communication technology supports a frequency hopping process; and
   a processor circuit configured to calculate isolation according to a signal-in-air power spectral density of the transmitting signal and the leakage signal power spectral density,
   wherein the isolation is for determining whether to adjust the transmitter device.

2. The isolation estimation system of claim 1, wherein the first communication technology is Wi-Fi technology, and the second communication technology is Bluetooth technology.

3. The isolation estimation system of claim 1, wherein the frequency hopping process is an Adaptive Frequency Hopping (AFH) process.

4. The isolation estimation system of claim 1, wherein the processor circuit calculates the isolation according to the signal-in-air power spectral density, the leakage signal power spectral density, and a background noise power spectral density.

5. The isolation estimation system of claim 4, wherein the processor circuit calculates the isolation according to the signal-in-air power spectral density and the leakage signal power spectral density if the leakage signal power spectral density is greater than the background noise power spectral density and a difference between the leakage signal power spectral density and the background noise power spectral density is greater than a first value.

6. The isolation estimation system of claim 5, wherein the processor circuit calculates the isolation according to the signal-in-air power spectral density, the background noise power spectral density, and the leakage signal power spectral density if the leakage signal power spectral density is greater than the background noise power spectral density and the difference between the leakage signal power spectral density and the background noise power spectral density is less than or equal to the first value and is greater than or equal to a second value.

7. The isolation estimation system of claim 6, wherein the processor circuit calculates the isolation according to the signal-in-air power spectral density, the background noise power spectral density, and an estimation value if the leakage signal power spectral density is equal to or less than the background noise power spectral density, or the leakage signal power spectral density is less than the background noise power spectral density and the difference between the leakage signal power spectral density and the background noise power spectral density is less than the second value.

8. The isolation estimation system of claim 1, wherein the processor circuit reduces a transmitting power of the transmitter device if the calculated isolation is less than a threshold value.

9. An isolation estimation method, comprising:
   transmitting a transmitting signal to a first receiving device by a transmitter device, wherein the transmitter device adopts a first communication technology;
   acquiring a leakage signal power spectral density of a leakage signal corresponding to the transmitting signal by a second receiver device, wherein the second receiver device adopts a second communication technology, wherein a bandwidth of the second communication technology is narrower than a bandwidth of the first communication technology, and the second communication technology supports a frequency hopping process; and
   calculating isolation according to a signal-in-air power spectral density of the transmitting signal and the leakage signal power spectral density by a processor circuit,
   wherein the isolation is for determining whether to adjust the transmitter device.

10. The isolation estimation method of claim 9, wherein the first communication technology is Wi-Fi technology, and the second communication technology is Bluetooth technology.

11. The isolation estimation method of claim 9, wherein the frequency hopping process is an Adaptive Frequency Hopping process.

12. The isolation estimation method of claim 9, further comprising:
    calculating the isolation according to the signal-in-air power spectral density, the leakage signal power spectral density, and a background noise power spectral density by the processor circuit.

13. The isolation estimation method of claim 12, further comprising:
    calculating the isolation according to the signal-in-air power spectral density and the leakage signal power spectral density by the processor circuit if the leakage signal power spectral density is greater than the background noise power spectral density and a difference between the leakage signal power spectral density and the background noise power spectral density is greater than a first value.

14. The isolation estimation method of claim 13, further comprising:
    calculating the isolation according to the signal-in-air power spectral density, the background noise power spectral density, and the leakage signal power spectral density by the processor circuit if the leakage signal power spectral density is greater than the background noise power spectral density and the difference between the leakage signal power spectral density and the background noise power spectral density is less than or equal to the first value and is greater than or equal to a second value.

15. The isolation estimation method of claim 14, further comprising:
    calculating the isolation according to the signal-in-air power spectral density, the background noise power spectral density, and an estimation value by the processor circuit if the leakage signal power spectral density is equal to or less than the background noise power spectral density, or the leakage signal power spectral density is less than the background noise power spectral density and the difference between the leakage signal power spectral density and the background noise power spectral density is less than the second value.

16. The isolation estimation method of claim 9, further comprising:

reducing a transmitting power of the transmitter device by the processor circuit if the calculated isolation is less than a threshold value.

17. A processor circuit configured to calculate isolation according to a signal-in-air power spectral density of a transmitting signal and a leakage signal power spectral density, to determine whether to adjust a transmitter device, wherein the transmitter device is configured to transmit the transmitting signal to a first receiving device, wherein the leakage signal power spectral density corresponds to a leakage signal received by a second receiver device, and the leakage signal corresponds to the transmitting signal, wherein the transmitter device adopts a first communication technology, wherein the second receiver device adopts a second communication technology, wherein a bandwidth of the second communication technology is narrower than a bandwidth of the first communication technology, and the second communication technology supports a frequency hopping process.

18. The processor circuit of claim 17, wherein the processor circuit reduces a transmitting power of the transmitter device if the calculated isolation is less than a threshold value.

* * * * *